United States Patent
Bocionek et al.

(10) Patent No.: US 6,801,227 B2
(45) Date of Patent: Oct. 5, 2004

(54) SYSTEM AND USER INTERFACE SUPPORTING USER NAVIGATION AND CONCURRENT APPLICATION OPERATION

(75) Inventors: Siegfried Bocionek, Wayne, PA (US); Ajit Singh, Plainsboro, NJ (US)

(73) Assignee: Siemens Medical Solutions Health Services Inc., Malvern, PA (US)

( * ) Notice: Subject to any disclaimer, the term of this patent is extended or adjusted under 35 U.S.C. 154(b) by 603 days.

(21) Appl. No.: 09/848,985

(22) Filed: May 4, 2001

(65) Prior Publication Data

US 2002/0093537 A1 Jul. 18, 2002

Related U.S. Application Data

(60) Provisional application No. 60/261,898, filed on Jan. 16, 2001.

(51) Int. Cl.[7] .................................................. G09G 5/00
(52) U.S. Cl. ...................................................... 345/777
(58) Field of Search ................................ 345/853–855, 345/767–777, 760, 779

(56) References Cited

U.S. PATENT DOCUMENTS

| | | | | |
|---|---|---|---|---|
| 5,937,042 A | | 8/1999 | Sofman | 379/113 |
| 6,002,398 A | | 12/1999 | Wilson | 345/346 |
| 6,049,812 A | * | 4/2000 | Bertram et al. | 715/516 |
| 6,166,736 A | | 12/2000 | Hugh | 345/340 |
| 6,288,753 B1 | * | 9/2001 | DeNicola et al. | 348/586 |
| 6,301,573 B1 | * | 10/2001 | McIlwaine et al. | 706/61 |
| 6,310,630 B1 | * | 10/2001 | Kulkami et al. | 345/776 |
| 6,359,634 B1 | * | 3/2002 | Cragun et al. | 345/777 |
| 6,370,355 B1 | * | 4/2002 | Ceretta et al. | 434/350 |
| 6,587,668 B1 | * | 7/2003 | Miller et al. | 434/350 |
| 6,628,311 B1 | * | 9/2003 | Fang | 345/777 |

OTHER PUBLICATIONS

NetCaptor Browser Tab Interface copyright 1998–2001 stilesoft inc., Dec. 14, 2000.
EarthNavigator version 3.02, Apr. 18, 2001.
NetCaptor 6.1.1 FInal Available, Dec. 14, 2000.

* cited by examiner

Primary Examiner—Kristine Kincaid
Assistant Examiner—Anh T. Nguyen
(74) Attorney, Agent, or Firm—Alexander J. Burke

(57) ABSTRACT

A processing and user interface system supports Internet application and web page navigation for sequential task oriented processes, workflow management and user specific, customizable, interactive and other organizable processes. A network (Internet, Intranet or other network) compatible user interface system supports a process including a sequence of subtasks. The system initiates display of a composite window representing a plurality of overlaid tabbed web page (or application) windows each including a visible tab incorporating an identifier identifying a function provided by a web page or application window associated with a particular subtask of the sequence of subtasks. The visible tabs and corresponding overlaid tabbed windows are sequentially ordered in accordance with the sequence of subtasks. The system initiates display of a subtask web page or application window in the foreground of the composite window in response to user selection of a visible tab corresponding to the subtask web page or application window.

21 Claims, 7 Drawing Sheets

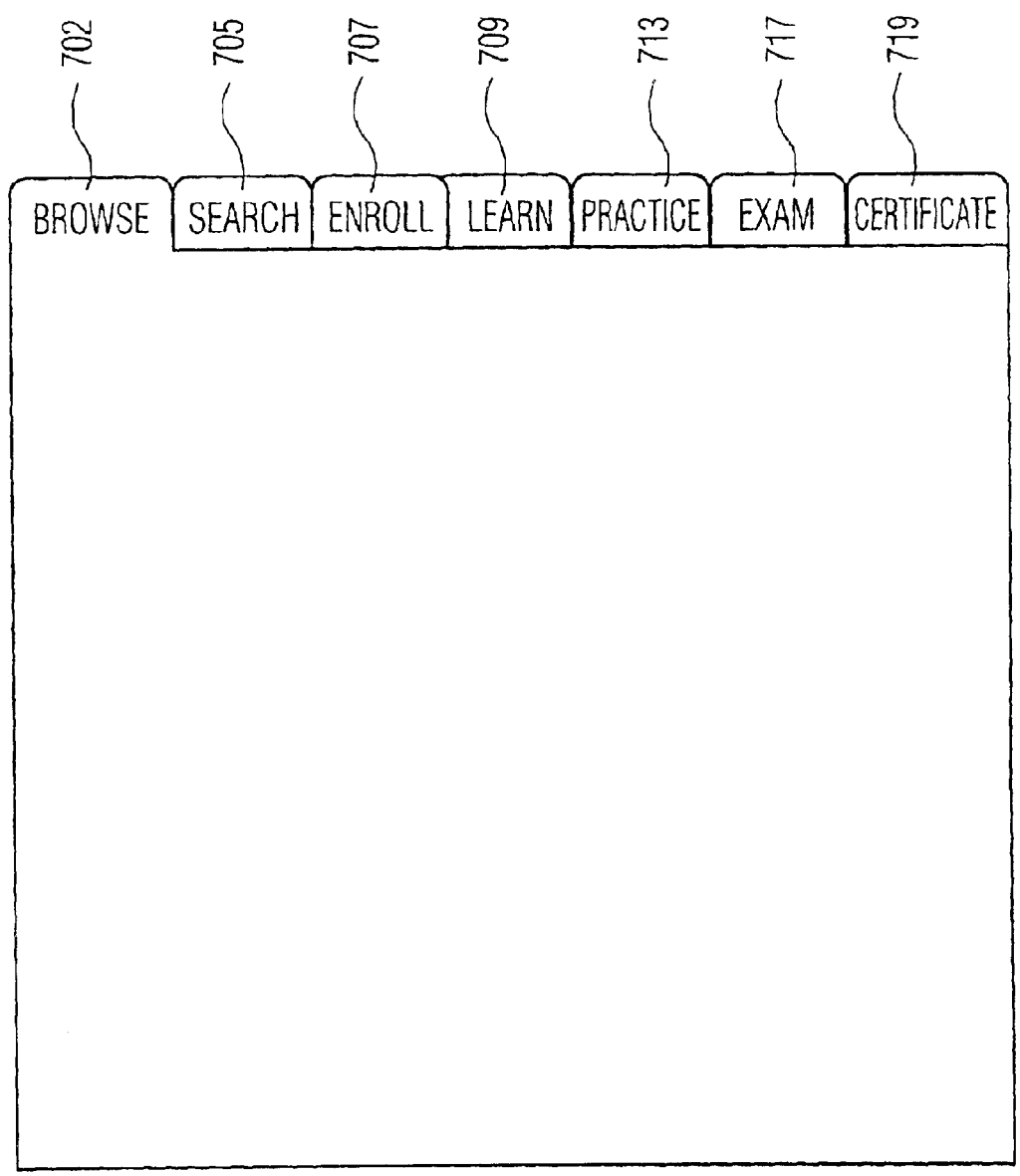

SYSTEM AND USER INTERFACE SUPPORTING USER NAVIGATION AND CONCURRENT APPLICATION OPERATION

This is a non-provisional application of provisional application Ser. No. 60/261,898 by S. Bocionek et al. filed Jan. 16, 2001.

FIELD OF THE INVENTION

This invention concerns a system and user interface supporting navigation and processing for use in a processing system such as a PC, server, networking device or other device.

BACKGROUND OF THE INVENTION

The management of information for medical purposes for use by physicians, hospital staff and other workers in the health care field poses a number of challenges. The information required by a physician, to optimize health care, is both varied in nature and in the sources from which it must be derived. A physician may typically need to have access to patient medical records, diagnostic images, diagnostic and dietary information systems, an appointment schedule, patient test results, medical literature, a prescription and drug interaction management system, insurance and billing information as well as a staff management system, for example. Access to such information and related services necessitate the use of a system including a communication platform supporting Internet operation and possibly local Intranet operation. Further, it is desirable that such a system for providing access to such an array of comprehensive information sources and related services should also provide a user interface that is suitable for use by a layman in the field and not require extensive operator training.

An Internet compatible health care management system needs to provide access to health care information and related services in the form of web page images derived from varied web sites via a user interface such as a web browser. Examples of web browser user interfaces include Microsoft Explorer or Netscape Navigator interfaces. Such browser interfaces are used for initiating acquisition of web pages that consist of passive information (e.g., text, images, and links to multimedia content including audio or video clips) and interactive items (e.g., involving data entry), and applications that can be launched (e.g., for home banking). Further, a browser interface supports user navigation both within an individual web page and between web pages, and also between web pages and applications. This is supported through the provision of links (usually underlined, or marked text or icons) or active map areas within a page. A page can also be sub-structured in a tabcard-like manner with tabs on top of each tabcard being used for grouping various topics, or lists of choices, etc. In addition, a browser interface supports user navigation within a history list of previously accessed URLs (Universal Resource Locators) and their corresponding web pages (e.g. via forward-backward symbol activation), and also via selection of preferred or stored links (e.g., favorites) of either the user or others. A web browser interface also typically may be used to select search engines for finding specific pages based on keyword search or other query based searches.

There are a number of difficulties encountered in navigating between web pages especially in those instances where large numbers of web pages are involved. The semantics of the relationship or hierarchy between the links is not well-defined (e.g., in a pure tree based hierarchy for subgrouping, sets of related information, etc). In this and in other types of navigation a user often maintains a sort of link hierarchy in his mind, perhaps supported by browser maintained history lists. Such a memory dependent approach often leads to failures and time-consuming new search attempts to already visited web pages. Another difficulty arises in the presentation of the web pages that have been previously acquired and that are available for display. Common disadvantages of currently used navigation systems include the fact that multiple URL (or other web page navigation representative lists) are presented to the user in a manner that does not reflect the organization a user desires for his particular task or application. Currently available tabcard interfaces are used for grouping multi-choice lists and are item-oriented (grouping similar or related items on one tabcard), rather than task or workflow oriented.

A system according to invention principles addresses these problems and derivative problems

SUMMARY OF INVENTION

A processing and user interface system supports network (including Internet or Intranet, for example) application and web page navigation for sequential task oriented processes, workflow management and user specific, customizable, interactive and other organisable processes. A network compatible user interface system supports a process including a sequence of subtasks. The system initiates display of a composite window representing a plurality of overlaid tabbed web page (or application) windows each including a visible tab incorporating an identifier identifying a function provided by a web page (or application interface display window) associated with a particular subtask of the sequence of subtasks. The visible tabs and corresponding overlaid tabbed windows are sequentially ordered in accordance with the sequence of subtasks. The system initiates display of a subtask web page (or application window) in the foreground of the composite window in response to user selection of a visible tab corresponding to the subtask web page or application window.

In a feature of the invention, a workflow sequence comprises a plurality of business or on-line education supporting tasks.

BRIEF DESCRIPTION OF THE DRAWING

FIG. 7 shows an exemplary user interface composite window including multiple overlaid tabbed web pages for the tasked based workflow of an on-line education application, according to invention principles.

DETAILED DESCRIPTION OF PREFERRED EMBODIMENTS

Figure 1:
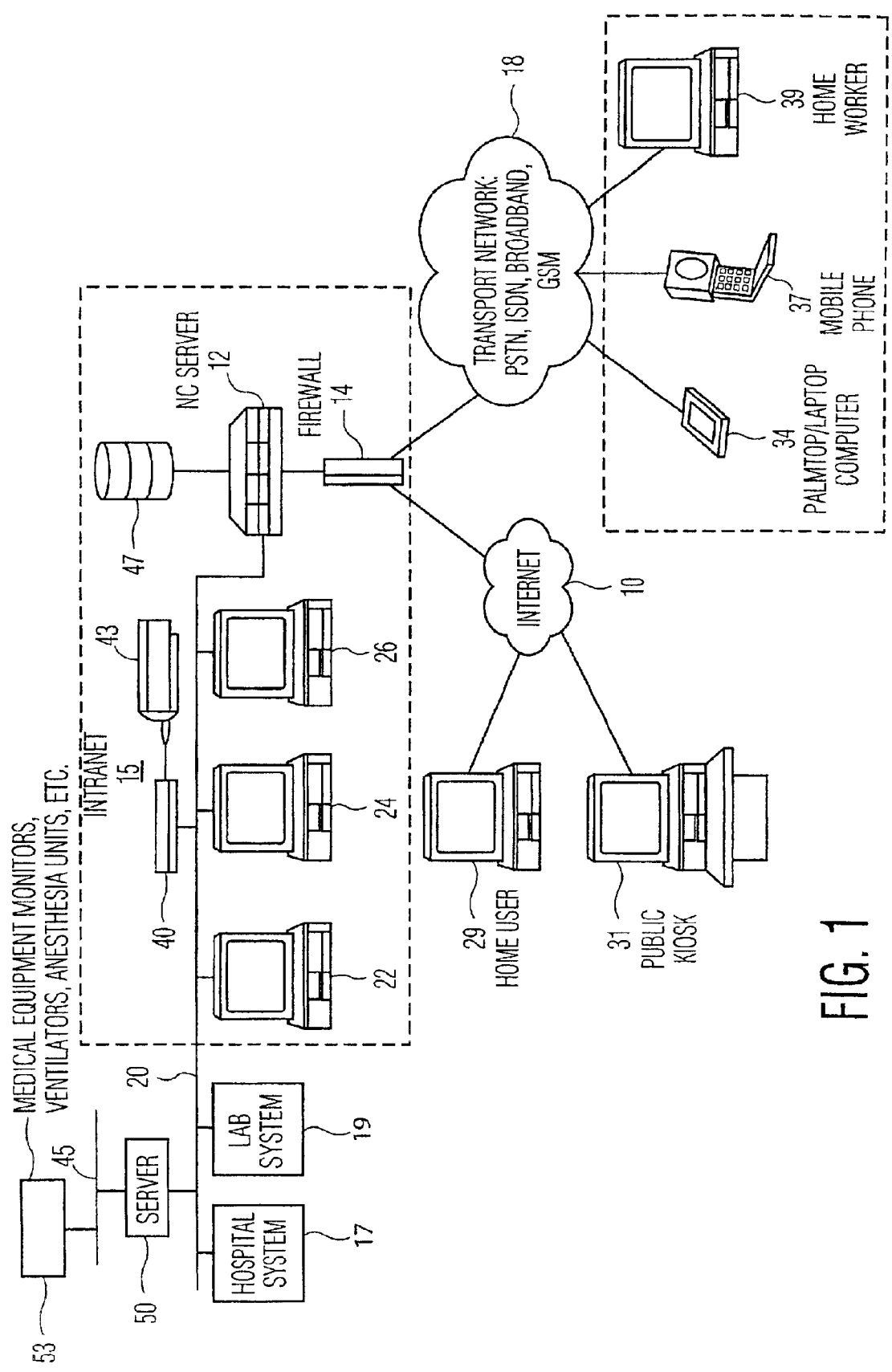
FIG. 1 shows a network employing a health care information management system employing a tabbed web page user interface, according to invention principles.

FIG. 1 shows a network employing a health care information management network employing a tabbed web page user interface and processing system supporting a sequential task based workflow. The processing and user interface system supports Internet application and web page navigation for sequential task oriented processes, workflow management and user specific, customizable, interactive and other organizable processes. The described system permits any workflow or task comprising sequentially definable subtasks to be advantageously decomposed into a form representable by hierarchically arranged tabbed web page windows. The tabbed web page windows are structured to simplify network (including Intranet and Internet) implementation of business to business and business to consumer interaction for commercial transactions and other purposes. The system advantageously simplifies user interface and navigation in a web based commercial transaction or other application environment and thereby facilitates increased user productivity via easier and faster use of web based applications.

The distributed health care information management network of FIG. 1 comprises an exemplary hospital or medical Intranet communicating with devices via a hierarchy of local area networks (LANs) or wide area networks (WANs) as well as communicating via the Internet and other telecommunication (including wireless or landline) networks. The information management network is Internet Protocol (IP) compatible but may also employ other protocols such as, for example, X.25, frame relay, IBM SNA etc. and may use any type of network architecture that provides communication connectivity among the networked devices. Specifically, the health care information management network of FIG. 1 comprises an Intranet 15 communicating on local area network (LAN) 20 with a laboratory test facility computer system 19, a hospital computer system 17 and server 50. Intranet 15 also communicates via server 50 with medical equipment 53 comprising patient monitoring equipment, ventilators and anesthesia units, for example. In addition Intranet 15 communicates via firewall 14 (supporting remote secure access) and the Internet 10 with other remote units including home user 29 and public kiosk user 31. Similarly, Intranet 15 communicates via firewall 14 and telecommunication network 18 with other remote units including palmtop/lap top computer 34, mobile phone 37 and a home user 39.

Intranet 15 includes a network server 12 connected to storage device 47 as well as firewall 14. Server 12 communicates on Ethernet-compatible LAN 20 with PCs 22, 24 and 26 and also with other Intranet devices including workstation 40 (connected to printer 43), for example. Server 12, via LAN 20, acquires, collates and processes patient medical record information and diagnostic images from hospital system 17, patient diagnostic and test results from laboratory system 19 and data from ventilators, anesthesia units, intravenous pumps and other medical monitors via server 50 and via Buses 45. Buses 45 comprise different bus types including a Medical Interface Bus (MIB) and a DICOM (Digital Imaging and Communications in Medicine protocol standard (developed approximately 1990)) compatible bus, for example. A MIB is a known medical industry standard for locally connecting medical devices together and is typically used to interconnect medical devices in a patient's room, such as for ventilators, anesthesia units etc., for both display and control to administer care and monitor a particular patient. A DICOM compatible bus is used for conveying and accessing medical image data.

Server 12 accesses the Internet 10 via firewall 14 to acquire, collate and process information from diagnostic and dietary information databases, medical literature sources and an on-line prescription and drug interaction management system. In addition, server 12 accesses insurance and billing information via the Internet 10 and firewall 14 and communicates with remote devices including palmtop 34, mobile phone 37 and home PC 39 via transport network 18 to support remote access to the health care information management network. Thereby, physicians and other authorized medical personnel are able to access the health care management system on the local Intranet (e.g., using PCs 22, 24 and 26) or remotely via the Internet 10 using devices 29 and 31 or network 18 using devices 34, 37 and 39, for example.

The network architecture of FIG. 1 is exemplary only. The health care management system may be implemented in any network environment involving one or more hierarchically arranged LANs or WANs including Ethernet-compatible LANs (used to connect different hospital departments, for example) and multiple MIBs for corresponding multiple patients. Alternatively, medical devices may be directly connected to a LAN (e.g., LAN 20). In addition, a remote site such as home user 29 is able to access the server 12 via firewall 14 using a dial-up telephone connection, ADSL, cable modem or other types of connection. Further, the described system is applicable to applications operating remotely or locally that generate overlaid composite application windows or graphical images not just web page windows.

Figure 2:
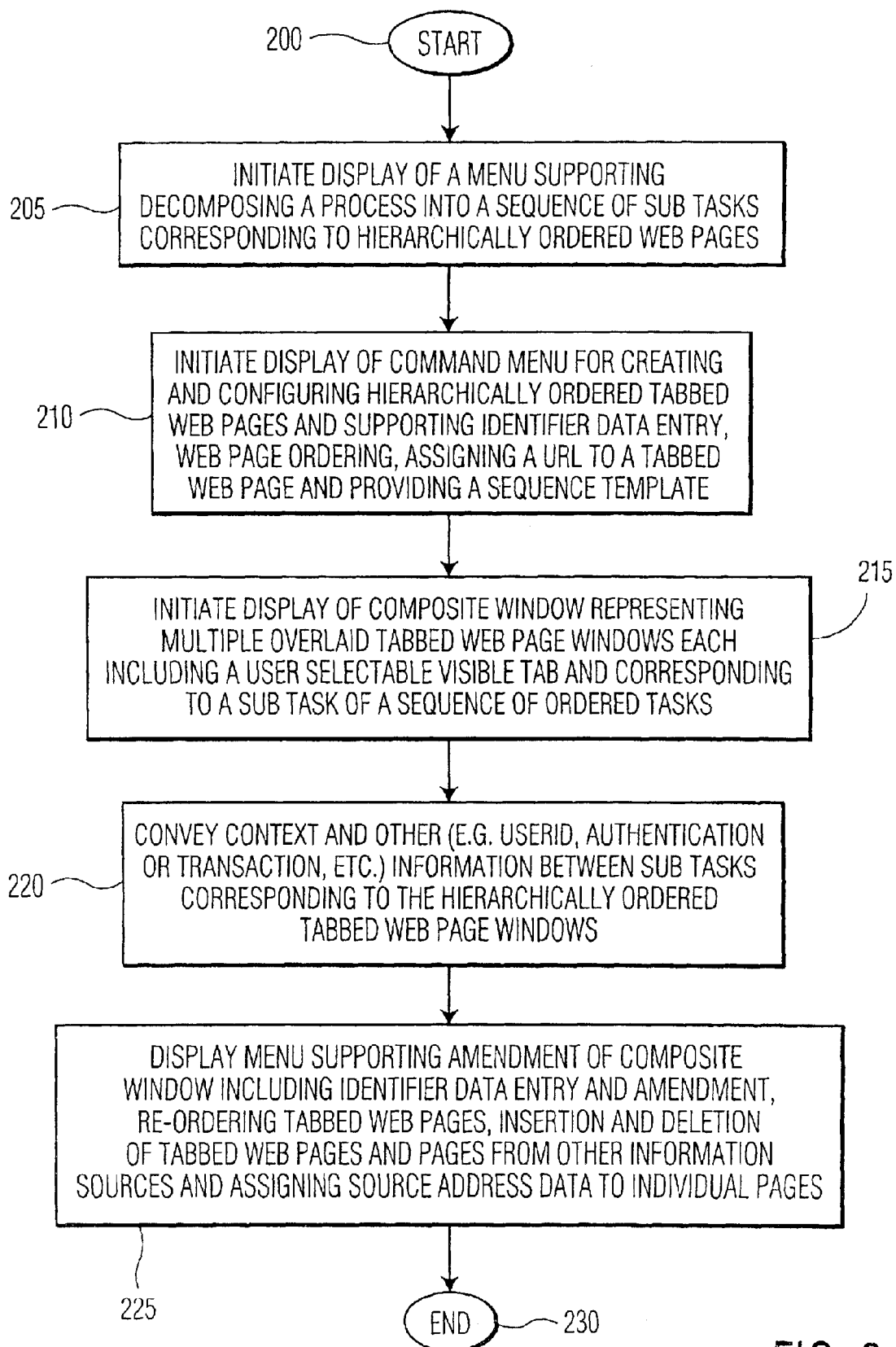
FIG. 2 shows a flowchart of a process for providing and amending a user interface composite window including multiple overlaid tabbed web pages supporting a tasked based workflow, according to invention principles.

FIG. 2 shows a flowchart of an application process employed by a server 12 application for providing and amending a user interface composite window including multiple overlaid tabbed web pages supporting a tasked based workflow. The tabbed web page composite window is provided by the server 12 application to one or more requesting devices in the network of FIG. 1. However, it is to be noted that in other embodiments server 12 may reside at any level of the network hierarchy of FIG. 1 since all the different levels of the network, as well as remote sites in FIG. 1, are interconnected. Server 12 may be hosted, for example, by a computer system that is capable of running Microsoft NT operating system. Further, in another embodiment, the process of FIG. 2 is executed as a local application within a PC or other device in the network of FIG. 1 (such as within PCs 22, 24, 26, 29, kiosk 31 or within devices 34, 37 and 39, for example).

Following the start at step 200 of FIG. 2, the server 12 application (FIG. 1) in step 205 initiates display of a web browser on a requesting PC on LAN 20. The displayed web browser includes menu items supporting the decomposition of a process into a sequence of tasks (a workflow) corresponding to hierarchically ordered web pages. Server 12 downloads the exemplary web browser of FIG. 3 incorporating icons 305, 310 and 315 for initiating functions supporting the decomposition of a process and the creation and alteration of a tabbed web page user interface. Specifically, icon 305 initiates generation of a menu including menu items facilitating decomposing a process into a sequence of ordered sub-tasks comprising a workflow for an e-business, on-line education or other task based process, for example. Any complex task a user performs through a web browser may be divided into subtasks, following a typical sequence (workflow) an average user would employ on the task. Menu items generated in step 305 support partitioning and/or identification of discrete subtasks comprising the overall process. An individual subtask is associated with an individual web page and is identified as a task that encompasses the functions available within the individual web page.

Figure 3:
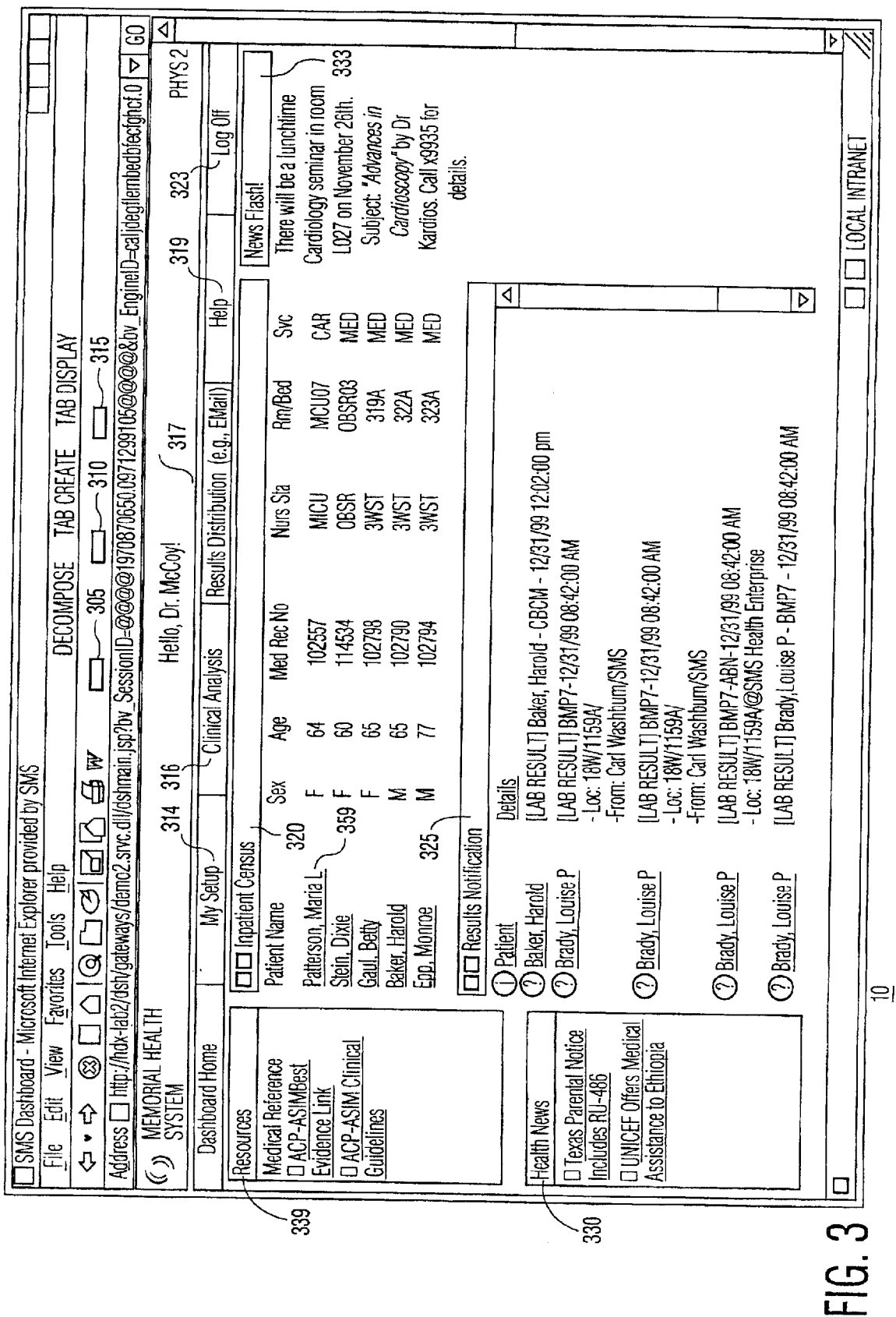
FIG. 3 shows a browser incorporating icons for initiating functions for providing and amending a tabbed web page user interface composite window supporting a tasked based workflow, according to invention principles.

In step 210 of FIG. 2, the server 12 application (FIG. 1) initiates display of a command menu on a requesting PC on LAN 20 in response to user activation of icon 310 in the browser interface of FIG. 3. The command menu enables the creation and configuration of hierarchically ordered web pages each having a visible labeled task identification tab and each being associated with a subtask of a sequence of tasks comprising a process or workflow. A resultant task web page may be termed a tabbed web task page. The tab includes a small text or symbol that lets the user easily understand what the tabbed web task page is used for. The displayed command menu supports user functions including the ordering of tabbed web pages, the entering of identifier data for incorporation in a visible tab, the provision of a template tabbed web page sequence, and the assignment of a tabbed web page sequence or subtasks to particular web page universal resource locators (URLs).

In step 215 of FIG. 2, the server 12 application (FIG. 1) initiates display of a composite tabbed web page window on a requesting PC on LAN 20 in response to user activation of icon 315 in the browser interface of FIG. 3. The composite tabbed web page window represents multiple overlaid tabbed web page windows each including a visible tab incorporating an identifier identifying a function provided by a tabbed web page. An individual tabbed web page is associated with a particular subtask of a sequence of subtasks comprising a process or workflow and visible tabs and corresponding overlaid tabbed windows are sequentially ordered in accordance with the sequence of subtasks. A particular subtask web page is displayed in the foreground of the composite window upon user selection of a visible tab corresponding to the particular subtask web page.

Figure 4:
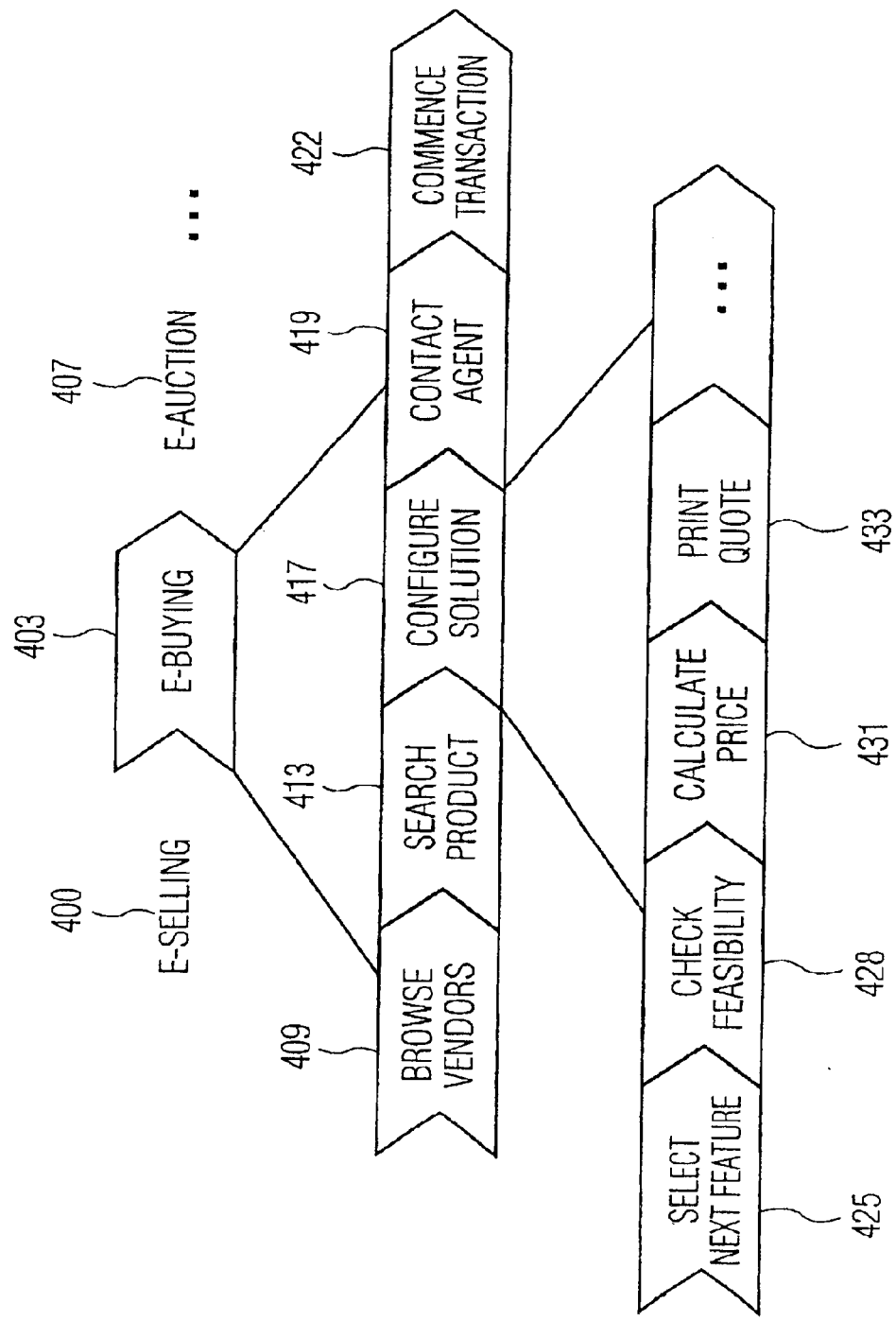
FIG. 4 shows an illustration of an e-business sequential task based workflow for presentation using a tabbed web page display, according to invention principles.
Figure 6:
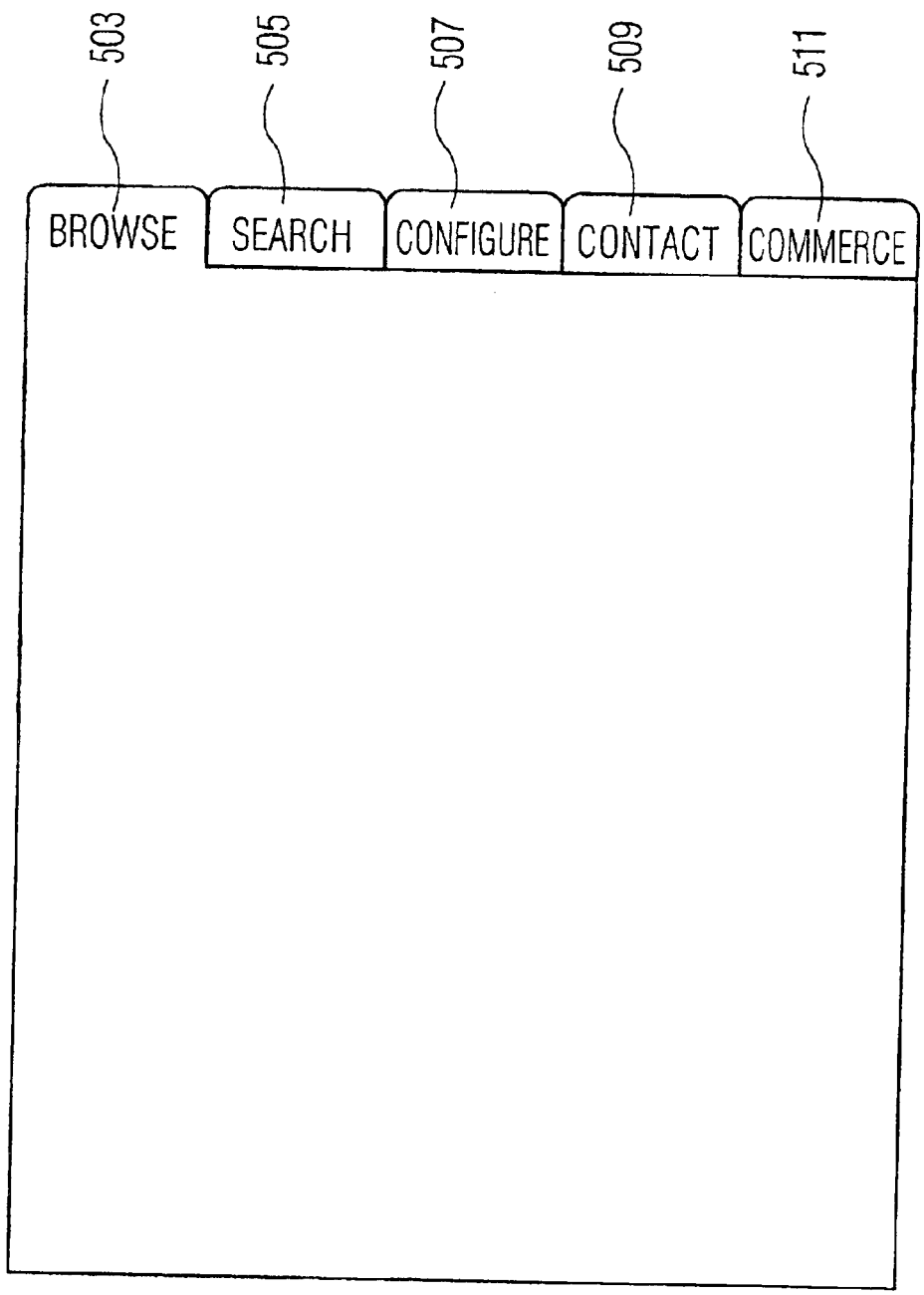
FIG. 6 shows the top level web page of the initial task of the exemplary user interface composite window of FIG. 5, according to invention principles.

FIG. 6 shows an exemplary composite tabbed web page window for an e-business type application featuring the display of an initial browsing task web page 503 of an e-business task sequence in the foreground of the composite window. FIG. 4 shows an illustration of the e-business sequential task based workflow for the composite tabbed web page window shown in FIG. 6. Such an e-business workflow may be determined by decomposing a process into subtasks for almost any application including an electronic selling application 400 and an electronic auction application 407 as well as the depicted electronic buying application 403. Specifically, the electronic buying task 403 is decomposed into five subtasks that a user conducts on a web browser. These subtasks comprise browsing for information about the offerings of various vendors 409, searching for detailed information about the products of a selected vendor 413, configuring a solution 417, contacting a human agent 419 and conducting an associated commercial transaction 422. In turn, these subtasks may be decomposed into further subtasks. The configuring solution subtask 417, for example, may be decomposed into further subtasks including selecting a next feature 425, checking feasibility of a solution 428, calculating a price 431 and printing a quotation 433.

Subtasks 409, 413, 417, 419 and 422 are implemented within corresponding tabbed web task pages. Further, the visible tab associated with each individual tabbed subtask web page incorporates an identifier identifying the function provided by the subtask web page. An individual web page exhibits icons or other reference symbols supporting the functions involved within an individual subtask and also steers the associated user interaction. The tabbed web page for the configuring solution task 417, for example, contains icons supporting selection of a feature of the solution 425, checking the feasibility of the configuration 428, calculating the price of the solution 431, printing out a quote 433 and other functions as desired.

Figure 5:
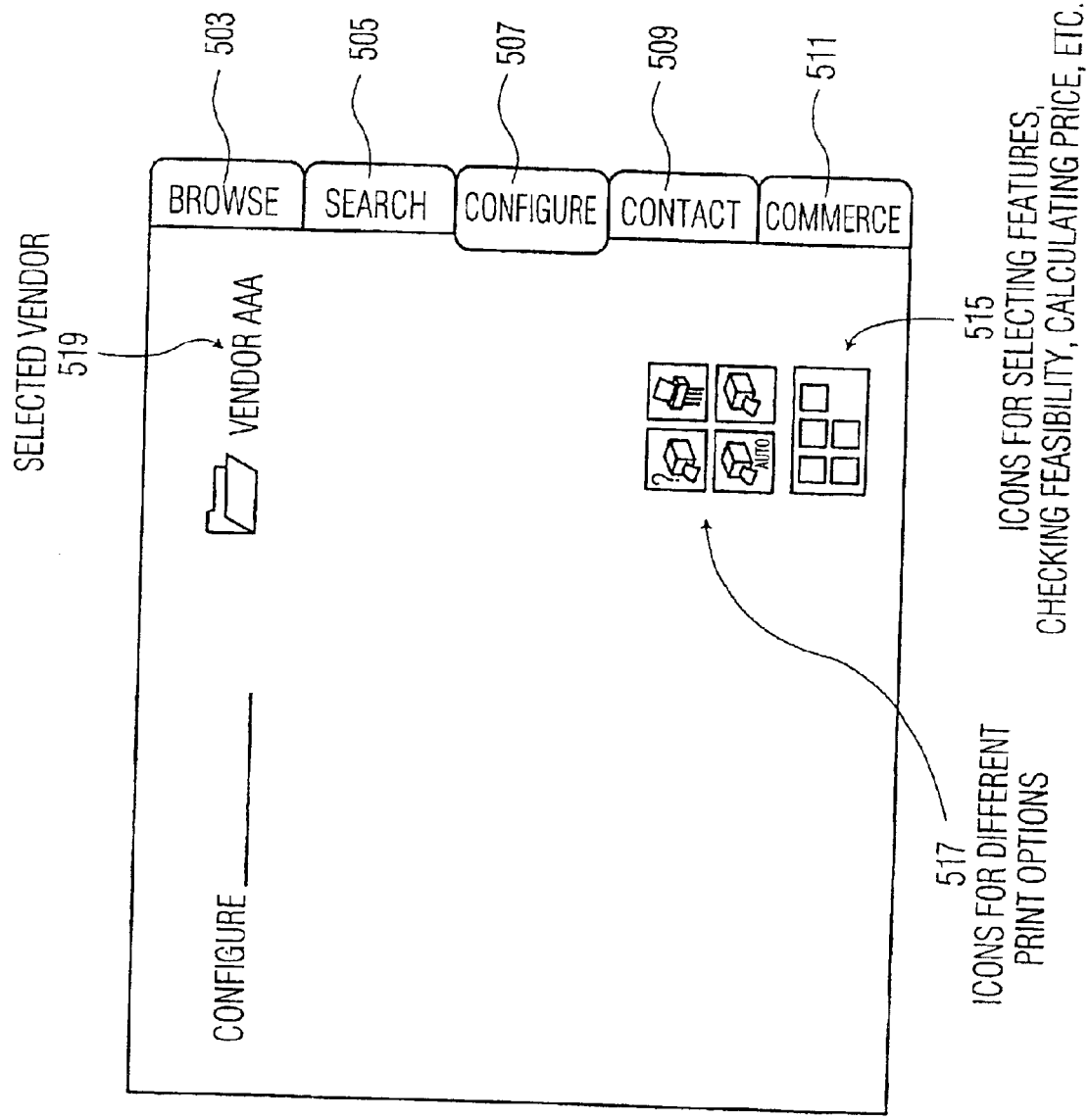
FIG. 5 shows an exemplary user interface composite window showing a specific configuring solution task web page of the tasked based workflow of the e-business application of FIG. 4, according to invention principles.

FIG. 5 shows an exemplary user interface composite window showing the configuring solution task web page 417 of the tasked based workflow of the e-business application of FIG. 4. Specifically, icons 515 of the configuring solution web page of FIG. 5 support, user selection of a feature of the solution (item 425 of FIG. 4), user checking the feasibility of the configuration (item 428 of FIG. 4) and user calculation of the price of the solution (item 431 of FIG. 4). In addition, icons 517 support user printing of a quotation (item 433 of FIG. 4) and provide other print options. Choices made by a user via a subtask web page may also be confirmed via the particular subtask web page. A user selected vendor or service provider is identified in item 519, for example. Further, a user is able to arrange the necessary information topics or functions within an individual web page such as vendors, products, clinical segments, etc. to be browsed, for example.

The composite tabbed web page window comprising multiple overlaid tabbed web pages associated with particular subtasks of a sequence of subtasks of a process (or workflow) provides substantial user navigational advantages. The visible tabs of the corresponding overlaid tabbed windows enable a user to easily identify a particular subtask within a sequence of subtasks. The tabs of the subtask web pages are readily visible in a browser and a user is able to navigate between subtask web pages by clicking on the tabs. These features, together with the use of clear, apposite, task identification nomenclature on individual tabs also provide instruction on the sequence of subtasks to be followed in performing a process in a natural, user friendly, easily understandable fashion. These tabs also support the navigation and the manipulation of data with one mouse-click avoiding the use of complex navigation paths in history lists of previously visited pages.

The key structuring advantages provided by these features is extended by employing a further composite window comprising multiple overlaid tabbed web pages associated with subsidiary subtasks of a particular subtask. Thereby, any tabbed web task page for a subtask is itself structured as a sequence of tabbed subtask web pages allowing the breakdown of any task of any complexity into the most appropriate hierarchy of sub-workflows. For example, the functions of the icons of FIG. 5 may themselves be presented as tabbed subtask web pages if they were more complex tasks. Thereby, the use of composite overlaid tabbed web page windows is extended in hierarchical fashion to a process of any complexity involving any number of levels of organization.

The key structuring advantage of the system is also extended by representing icons used for initiating functions of a particular subtask web page as overlaid tabbed graphics images. These graphic images are not web pages but are graphic images acquired as part of a single subtask web page. In another embodiment such overlaid graphic images may be stored locally in a video processing system for call and display by a downloaded web page, for example. The use of hierarchical tabbed images in this fashion is not restricted to web pages but may be used for any graphical user interface display to provide an easily navigable process or workflow. In such a display the composite tabbed subtask window may comprise multiple overlaid software application windows rather than web pages, for example. In contrast, currently available graphical user interfaces and browsers embed function icons in images at various levels typically in a variety of orientations unrelated to sequence in a manner that is not obvious or intuitive to an end-user.

FIG. 7 shows an education application user interface composite window including multiple overlaid tabbed web pages for the tasked based workflow of an on-line education application. The on-line education workflow is decomposed into seven subtasks that a user conducts on a web browser. These subtasks support browsing for information about the offerings of various online schools or courseware providers 702, searching for detailed information about the courses of a selected provider 705, enrolling in an on-line course (which may involve a payment transaction) 707, learning the subject matter of a course once enrolled 709, performing practice exercises involving learned subject matter 713, taking an on-line examination 717 and obtaining an examination certificate or course credit 719 (e.g., continuous medical education credits (CME) for a radiology course). These subtasks are represented as hierarchically arranged web pages identifiable by their labeled tabs in the composite window of FIG. 7.

Returning to the process of FIG. 2, the server 12 application (FIG. 1) in step 220 supports the process involved in the composite tabbed subtask web page window displayed in step 215 by sharing context information between the subtasks corresponding to different overlaid tabbed web pages. Such context information includes user identification information, user authorization information, or commercial transaction related information and other data, for example. The sharing of context data between tabbed subtask web pages allows a user to advantageously manipulate data objects on one page and continue working on another web page by keeping the changed values of the object available by various subtasks.

The server 12 application (FIG. 1) in step 225 (FIG. 2) initiates display of a menu supporting amendment and update of the previously created composite tabbed subtask web page window (displayed on a requesting PC in step 215). This is done using the menu generated in response to user activation of icon 310 in the browser interface of FIG. 3 or another icon (not shown in FIG. 3 to promote drawing clarity). The update menu enables the alteration of a composite tabbed subtask web page window by amendment, re-ordering and insertion or deletion of tabbed web pages and pages or other image displays from other information sources. The update menu also allows the entry and amendment of subtask web page identification information for insertion in individual tabs and allows the user to assign particular web page universal resource locators (URLs) to a tabbed web page sequence. The update menu also allows the user to re-order functions within individual task pages and to re-position associated icons. These capabilities help to customize interaction with a browser, and to tailor a typical (template) workflow or other workflow to meets individual preferences, thereby increasing user productivity.

In addition, evaluation and machine learning functions in the server 12 application are used to monitor user behavior and are used for automated or semi-automated customization and re-arrangement of the tabbed web task pages. (In the Semi-automated case a user is prompted for acceptance before the changes actually happen). The learning steps can be based on the monitoring of one user or many users as specified (collaborative learning) thereby enabling the collation of information for optimizing workflow and web task page formatting and design. Alternatively, it enables derivation of an average workflow/web task page design appealing to the majority of users. The identification of an optimal tabbed web page presentation, for example, may be based on navigation times or execution times for different users in navigating a specific workflow task sequence. However, many other target parameters and criteria for optimization may be used and may be included in adaptive evaluation and machine learning functions in the server 12 application. The process of FIG. 2 terminates at step 230.

The architectures and processes presented in FIGS. 1–4 are not exclusive. Other architectures and processes may also be derived in accordance with the principles of the invention to accomplish the same objectives. Further, the inventive principles may be employed in any user interface system involving navigation between images for invoking functions in processes involving sequentially performed tasks.

What is claimed is:

1. In an Internet compatible user interface system supporting a process including a sequence of subtasks, a method comprising the activities of:

initiating display of a composite window representing a plurality of overlaid tabbed web page windows each including a visible tab incorporating an identifier identifying a function provided by a web page associated with a particular subtask of an ordered sequence of subtasks, said sequence of subtasks being specifically ordered to perform a particular process involving user interaction with web pages associated with corresponding subtasks and wherein visible tabs and corresponding overlaid tabbed windows are sequentially ordered in accordance with said sequence of subtasks; and initiating display of a subtask web page in the foreground of said composite window in response to user selection of a visible tab corresponding to said subtask web page.

2. The method according to claim 1, including the activity of initiating display of command menu items supporting at least one function of, (a) ordering tabbed web pages, (b) providing a template tabbed web page sequence, and (c) assigning a tabbed web page sequence to particular web page universal resource locators (URLs).

3. The method according to claim 1, wherein said sequence of subtasks comprise a process involving an ordered sequential user interaction with said web pages associated with corresponding subtasks and said Internet compatible user interface system comprises a web browser.

4. The method according to claim 1, wherein said ordered sequence of subtasks comprises a workflow process including at least two functions from (a) browsing web pages, (b) searching for information, (c) configuring web page features, (d) providing capability to contact a human agent and (e) initiating a commercial transaction.

5. The method according to claim 1, wherein said ordered sequence of subtasks comprises a workflow process supporting at least two functions from, (a) browsing for educational course offerings, (b) searching for information about a course of a selected course provider, (c) enrolling in an on-line educational course, (d) learning about a specific course curriculum, (e) accessing a selected course, (f) providing course practice exercises and (g) obtaining course credit.

6. The method according to claim 1, wherein
said process involves a particular ordered sequential user interaction with an individual web page of said web pages associated with corresponding subtasks and
said identifier comprises at least one of (a) text and (b) a symbol.

7. The method according to claim 1, wherein
said visible tab is at least one of, (a) incorporated in a window used for displaying a retrieved web page and (b) embedded within said web page associated with a particular subtask of said sequence of subtasks.

8. The method according to claim 1, wherein
said composite window supports a plurality of concurrently operating Internet based applications each corresponding to one of said plurality of overlaid tabbed web page windows.

9. The method according to claim 1, including the activity of
sharing context information between subtasks corresponding to different overlaid tabbed web pages, said context information comprising at least one of, (a) user identification information, (b) user authorization information, and (c) commercial transaction identification information.

10. A The method according to claim 1, including the activities of
receiving user preference data determining display image characteristics and
in response to said received user preference data, adaptively re-ordering at least one of, (a) said overlaid tabbed web page windows and (b) functions provided by a web page associated with a particular subtask.

11. The method according to claim 1, wherein,
a first subtask comprises a plurality of subsidiary subtasks, and including the activity of
initiating display of a second composite window representing a second plurality of overlaid tabbed web page windows each including a visible tab incorporating an identifier identifying a function provided by a web page associated with a subsidiary subtask of said plurality of subsidiary subtasks in response to user selection of a visible tab associated with said first subtask.

12. A user interface system supporting management of a workflow including a sequence of subtasks, comprising:
a first menu for use in assigning individual subtasks of said sequence to corresponding sequentially ordered tabbed web page windows; and
a composite window representing said overlaid tabbed web page windows each including a visible tab incorporating an identifier identifying a function provided by a web page associated with a particular subtask of a sequence of subtasks, said sequence of subtasks being specifically ordered to perform a particular process involving user interaction with web pages associated with corresponding subtasks and wherein visible tabs and corresponding overlaid tabbed windows are sequentially ordered in accordance with said sequence of subtasks.

13. A user interface system according to claim 12, including
a second menu for use in entering identifier data for incorporation in a visible tab of a user selected web page window of said sequentially ordered tabbed web page windows.

14. A user interface system according to claim 12, including
a second menu for use in allocating web page universal resource locators (URLs) to corresponding windows of said sequentially ordered overlaid tabbed web page windows.

15. A user interface system according to claim 12, wherein
said ordered sequence of subtasks comprising a process involving ordered sequential user interaction with said web pages associated with corresponding subtasks and
said user interface system comprises a web browser.

16. In an Internet compatible user interface system supporting a process including a sequence of subtasks, a method comprising the activities of:
initiating display of a composite window representing a plurality of overlaid tabbed web page windows each including a visible tab incorporating an identifier identifying a function provided by a web page associated with a particular subtask of a sequence of subtasks, said sequence of subtasks being specifically ordered to perform a particular process involving user interaction with web pages associated with corresponding subtasks and wherein visible tabs and corresponding overlaid tabbed windows are sequentially ordered in accordance with said sequence of subtasks; and
sharing context information between subtasks corresponding to different overlaid tabbed web pages.

17. A user interface system according to claim 16, wherein
said context information comprises at least one of, (a) user identification information, (b) user authorization information, and (c) commercial transaction identification identification information.

18. A user interface system according to claim 16, wherein
said composite window supports a plurality of concurrently operating Internet based applications each corresponding to one of said plurality of overlaid tabbed web page windows, and
said context information is shared between said concurrent applications.

19. In an Internet compatible user interface system supporting a process including a sequence of subtasks, a method comprising the activities of:
initiating display of a menu for use in decomposing a process into a sequence of individual subtasks corresponding to sequentially ordered tabbed web page windows; and
initiating display of a composite window representing a plurality of overlaid tabbed web page windows each including a visible tab incorporating an identifier identifying a function provided by a web page associated with a particular subtask of a sequence of subtasks, said sequence of subtasks being specifically ordered to perform a particular process involving user interaction with web pages associated with corresponding subtasks and wherein visible tabs and corresponding overlaid tabbed windows are sequentially ordered in accordance with said sequence of subtasks.

20. A user interface system according to claim 19, wherein
said activity of initiating display of a menu for use in decomposing a process into a sequence of individual subtasks comprises initiating generation of a menu for partitioning subtasks into two or more functions selected from (a) browsing web pages, (b) searching for information, (c) configuring web page features, (d) providing capability to contact a human agent and (e) initiating a commercial transaction.

21. In a user interface system supporting a process including a sequence of subtasks, a method comprising the activities of:

initiating display of a composite window representing a plurality of overlaid tabbed application windows each including a visible tab incorporating an identifier identifying a function provided by an application associated with a particular subtask of a sequence of subtasks, said sequence of subtasks being specifically ordered to perform a particular process involving user interaction with web pages associated with corresponding subtasks and wherein visible tabs and corresponding overlaid tabbed windows are sequentially ordered in accordance with said sequence of subtasks; and initiating display of a subtask application window in the foreground of said composite window in response to user selection of a visible tab corresponding to said subtask application.

* * * * *